(12) United States Patent
Ellmauthaler et al.

(10) Patent No.: US 11,732,578 B2
(45) Date of Patent: Aug. 22, 2023

(54) TOPSIDE INTERROGATION FOR DISTRIBUTED ACOUSTIC SENSING OF SUBSEA WELLS

(71) Applicant: Halliburton Energy Services, Inc., Houston, TX (US)

(72) Inventors: Andreas Ellmauthaler, Houston, TX (US); John L. Maida, Jr., Houston, TX (US); Ira Jeffrey Bush, Los Angeles, CA (US); Michel Joseph LeBlanc, Houston, TX (US); Glenn Andrew Wilson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 76 days.

(21) Appl. No.: 17/327,453

(22) Filed: May 21, 2021

(65) Prior Publication Data

US 2021/0270131 A1 Sep. 2, 2021

Related U.S. Application Data

(63) Continuation of application No. 16/586,091, filed on Sep. 27, 2019, now Pat. No. 11,047,230.

(Continued)

(51) Int. Cl.
*E21B 47/16* (2006.01)
*E21B 49/00* (2006.01)
(Continued)

(52) U.S. Cl.
CPC ............ *E21B 49/00* (2013.01); *E21B 47/135* (2020.05); *G01D 5/35306* (2013.01); *G01V 1/18* (2013.01); *G01V 1/52* (2013.01)

(58) Field of Classification Search
CPC ... E21B 49/00; E21B 47/135; G01D 5/35306; G01V 1/18; G01V 1/52
(Continued)

(56) References Cited

U.S. PATENT DOCUMENTS 6,933,491 B2 * 8/2005 Maida, Jr. .......... H04B 10/2589
250/227.14
9,766,371 B2 9/2017 Barfoot et al.
(Continued)

FOREIGN PATENT DOCUMENTS

WO 2019027854 2/2019

OTHER PUBLICATIONS

Silixa, iDAS Datasheet, 2018.
(Continued)

*Primary Examiner* — Naomi J Small
(74) *Attorney, Agent, or Firm* — John Wustenberg; C. Tumey Law Group PLLC

(57) ABSTRACT

A distributed acoustic system (DAS) method and system. The system may comprise an interrogator and an umbilical line comprising a first fiber optic cable and a second fiber optic cable attached at one end to the interrogator. The DAS may further include a downhole fiber attached to the umbilical line at the end opposite the interrogator and a light source disposed in the interrogator that is configured to emit a plurality of coherent light frequencies into the umbilical line and the downhole fiber. The method may include generating interferometric signals of the plurality of frequencies of backscattered light that have been received by the photo detector assembly and processing the interferometric signals with an information handling system.

20 Claims, 13 Drawing Sheets

Related U.S. Application Data

(60) Provisional application No. 62/849,025, filed on May 16, 2019.

(51) Int. Cl.
*G01D 5/353* (2006.01)
*G01V 1/18* (2006.01)
*G01V 1/52* (2006.01)
*E21B 47/135* (2012.01)

(58) Field of Classification Search
USPC .......................................................... 367/82
See application file for complete search history.

(56) References Cited

U.S. PATENT DOCUMENTS

| | | |
|---|---|---|
| 2004/0113104 A1 | 6/2004 | Maida, Jr. |
| 2014/0131033 A1 | 5/2014 | Sanchez |
| 2014/0152995 A1 | 6/2014 | Dong et al. |
| 2014/0347192 A1* | 11/2014 | Barfoot ................ E21B 47/135 340/854.7 |
| 2015/0014521 A1 | 1/2015 | Barfoot |
| 2016/0259083 A1* | 9/2016 | Barfoot .................. E21B 47/07 |
| 2017/0167245 A1 | 6/2017 | Dickenson et al. |
| 2017/0343389 A1 | 11/2017 | Parker et al. |
| 2018/0058982 A1 | 3/2018 | Hartog et al. |
| 2019/0101419 A1* | 4/2019 | Rowen .............. H01S 3/094011 |
| 2019/0128731 A1* | 5/2019 | Cedilnik ............. G01D 5/35361 |
| 2019/0323863 A1 | 10/2019 | Shatalin et al. |
| 2020/0233107 A1 | 7/2020 | Constantinou et al. |

OTHER PUBLICATIONS

Halliburton, FiberVSP™ Distributed Acoustic Sensing (DAS) Interrogator System, H013014, May 2019.
Halliburton, Pinnacle, FiberWatch Distributed Acoustic Sensing (DAS), H011998, Oct. 2015.
Halliburton, Sand Control, Sandface Instrumentation Gravel Pack System, H012009, Nov. 2015.
International Search Report and Written Opinion for Application No. PCT/US2019/054115, dated Feb. 12, 2020.
Notice of Allowance for U.S. Appl. No. 16/586,091 dated May 5, 2021.
Non-Final Office Action Summary for U.S. Appl. No. 16/586,091 dated Jun. 25, 2020.
Non-Final Office Action Summary for U.S. Appl. No. 16/586,091 dated Dec. 24, 2020.
Final Office Action Summary for U.S. Appl. No. 16/586,091 dated Oct. 14, 2020.

* cited by examiner

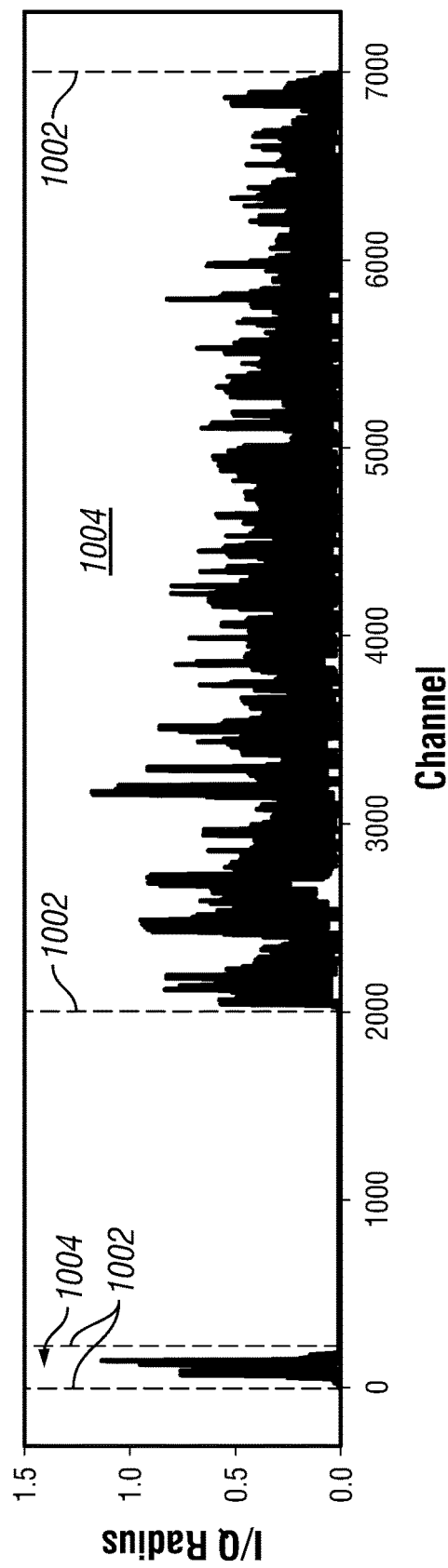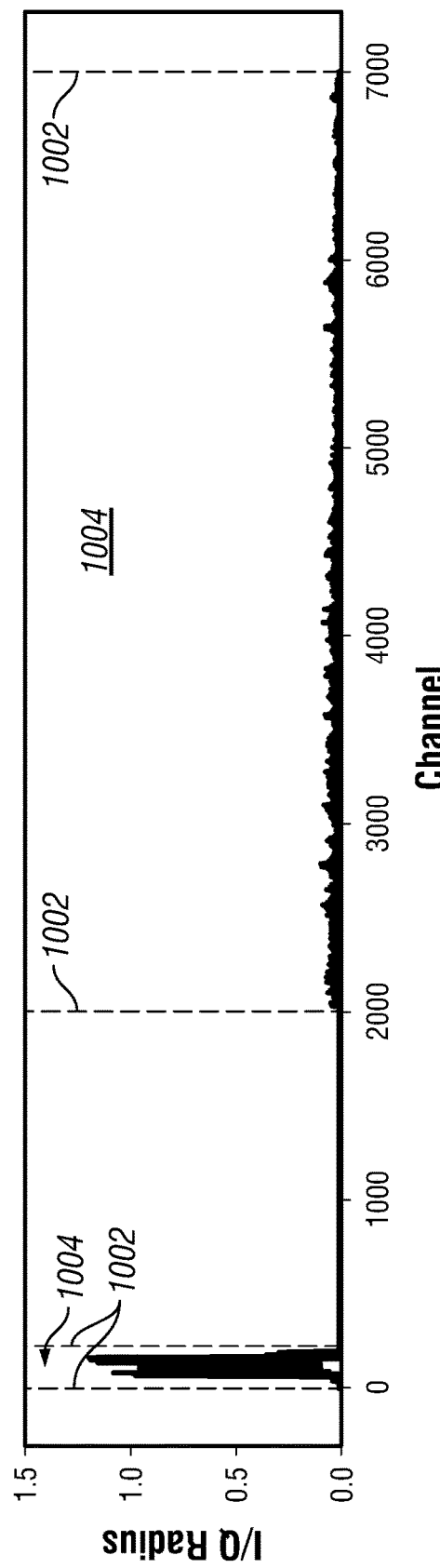

TOPSIDE INTERROGATION FOR DISTRIBUTED ACOUSTIC SENSING OF SUBSEA WELLS

BACKGROUND

Boreholes drilled into subterranean formations may enable recovery of desirable fluids (e.g., hydrocarbons) using a number of different techniques. A number of systems and techniques may be employed in subterranean operations to determine borehole and/or formation properties. For example, Distributed Acoustic Sensing (DAS) along with a fiber optic system may be utilized together to determine borehole and/or formation properties. Distributed fiber optic sensing is a cost-effective method of obtaining real-time, high-resolution, highly accurate temperature and strain (acoustic) data along the entire wellbore. In examples, discrete sensors, e.g., for sensing pressure and temperature, may be deployed in conjunction with the fiber optic cable. Additionally, distributed fiber optic sensing may eliminate downhole electronic complexity by shifting all electro-optical complexity to the surface within the interrogator unit. Fiber optic cables may be permanently deployed in a wellbore via single- or dual-trip completion strings, behind casing, on tubing, or in pumped down installations; or temporally via coiled tubing slickline, or disposable cables.

Distributed sensing is enabled by continuously sensing along the length of the fiber, and effectively assigning discrete measurements to a position along the length of the fiber via optical time-domain reflectometry (OTDR). That is, knowing the velocity of light in fiber, and by measuring the time it takes the backscattered light to return to the detector inside the interrogator, it is possible to assign a distance along the fiber.

Distributed acoustic sensing has been practiced for dry-tree wells, but has not been attempted in wet-tree (or subsea) wells, to enable interventionless, time-lapse reservoir monitoring via vertical seismic profiling (VSP), well integrity, flow assurance, and sand control. A subsea operation requires optical engineering solutions to compensate for losses accumulated through long (~5 to 100 km) lengths of subsea transmission fiber, 10 km of in—well subsurface fiber, and multiple wet- and dry-mate optical connectors, splices, and optical feedthrough systems (OFS).

BRIEF DESCRIPTION OF THE DRAWINGS

For a detailed description of the preferred examples of the disclosure, reference will now be made to the accompanying drawings in which.

DETAILED DESCRIPTION

The present disclosure relates generally to a system and method for using fiber optics in a DAS system in a subsea operation. Subsea operations may present optical challenges which may relate to the quality of the overall signal in the DAS system with a longer fiber optical cable. The overall signal may be critical since the end of the fiber contains the interval of interest, i.e., the well and reservoir sections. To prevent a drop in signal-to-noise (SNR) and signal quality, the DAS system described below may increase the returned signal strength with given pulse power, decrease the noise floor of the receiving optics to detect weaker power pulses, maintain the pulse power as high as possible as it propagates down the fiber, increase the number of light pulses that can be launched into the fiber per second, and/or increase the maximum pulse power that can be used for given fiber length.

Figure 1:
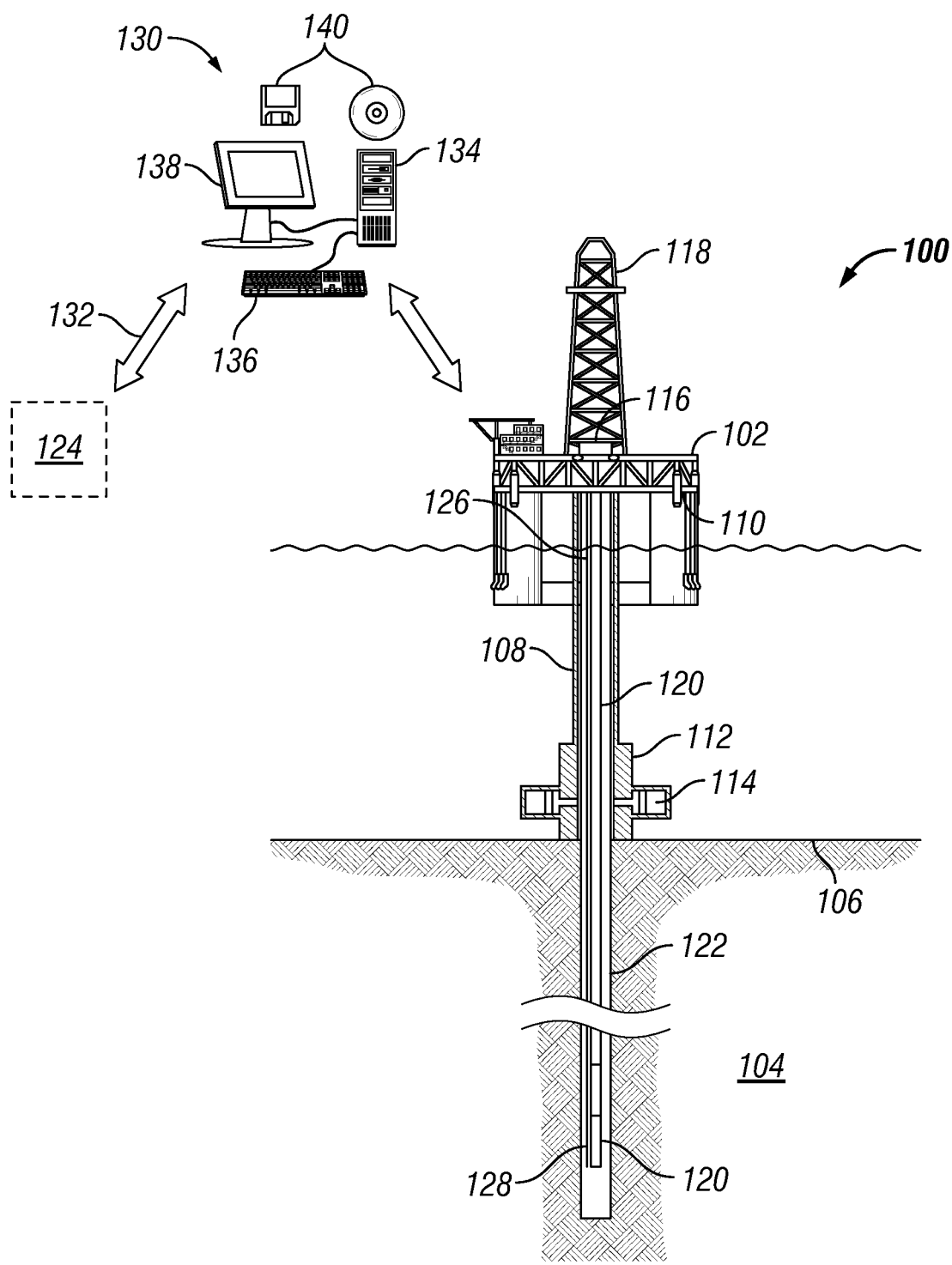
FIG. 1 illustrate an example of a well measurement system in a subsea environment.

FIG. 1 illustrates a well system 100 that may employ the principles of the present disclosure. More particularly, well system 100 may include a floating vessel 102 centered over a subterranean hydrocarbon bearing formation 104 located below a sea floor 106. As illustrated, floating vessel 102 is depicted as an offshore, semi-submersible oil and gas drilling platform, but could alternatively comprise any other type of floating vessel such as, but not limited to, a drill ship, a pipe-laying ship, a tension-leg platforms (TLPs), a "spar" platform, a production platform, a floating production, storage, and offloading (FPSO) vessel, and/or the like. Additionally, the methods and systems described below may also be utilized on land-based drilling operations. A subsea conduit or riser 108 extends from a deck 110 of floating vessel 102 to a wellhead installation 112 that may include one or more blowout preventers 114. In examples, riser 108 may also be referred to as a flexible riser, flowline, umbilical, and/or the like. Floating vessel 102 has a hoisting apparatus 116 and a derrick 118 for raising and lowering tubular lengths of drill pipe, such as a tubular 120. In examples, tubular 120 may be a drill string, casing, production pipe, and/or the like.

A wellbore 122 extends through the various earth strata toward the subterranean hydrocarbon bearing formation 104 and tubular 120 may be extended within wellbore 122. Even though FIG. 1 depicts a vertical wellbore 122, it should be understood by those skilled in the art that the methods and systems described are equally well suited for use in horizontal or deviated wellbores. During drilling operations, the distal end of tubular 120, for example a drill sting, may include a bottom hole assembly (BHA) that includes a drill bit and a downhole drilling motor, also referred to as a positive displacement motor ("PDM") or "mud motor." During production operations, tubular 120 may include a DAS system. The DAS system may be inclusive of an interrogator 124, umbilical line 126, and downhole fiber 128.

Figure 17:
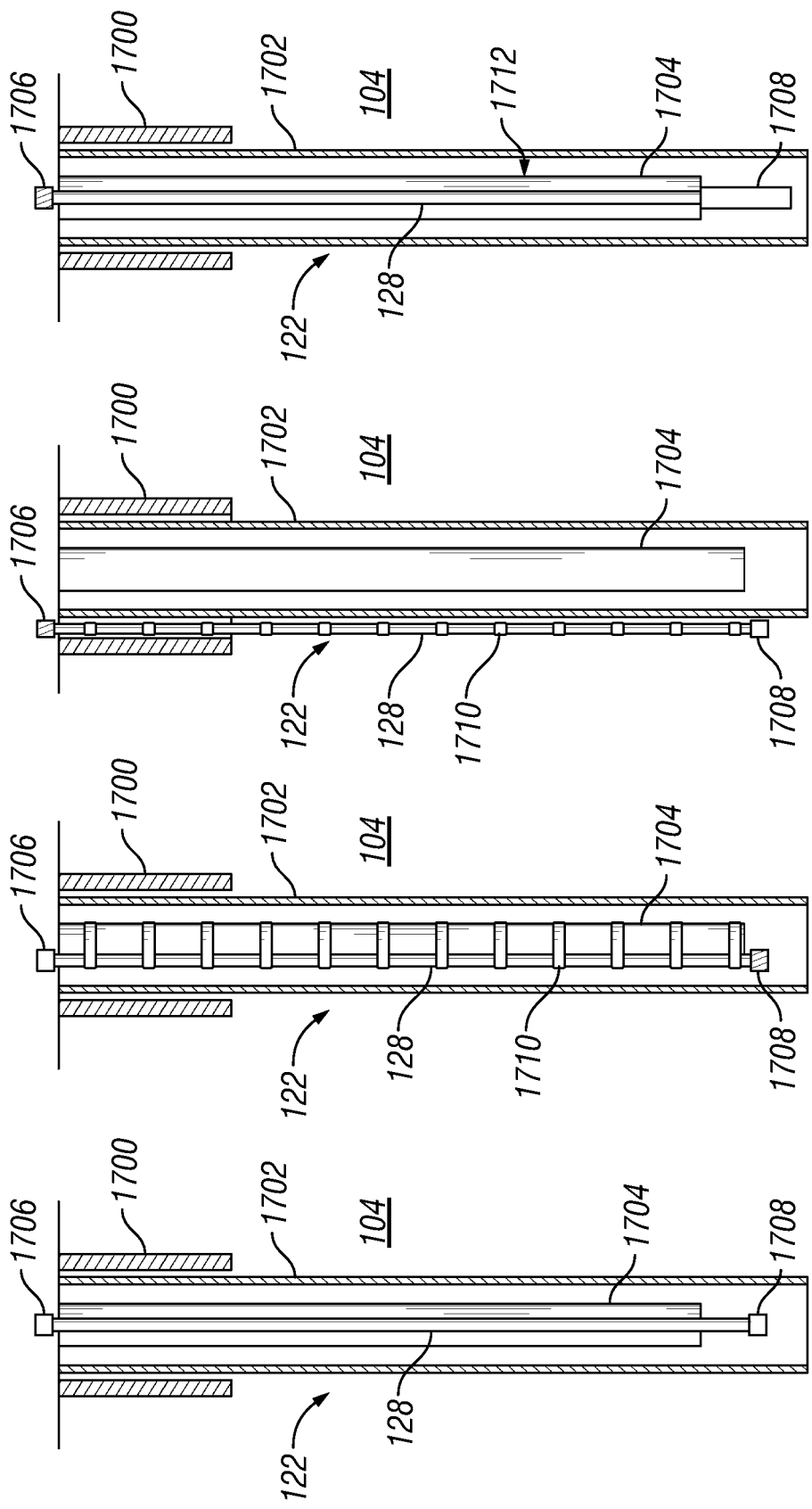
FIGS. 17A-17D illustrates examples of a downhole fiber deployed in a wellbore.
Figure 18:
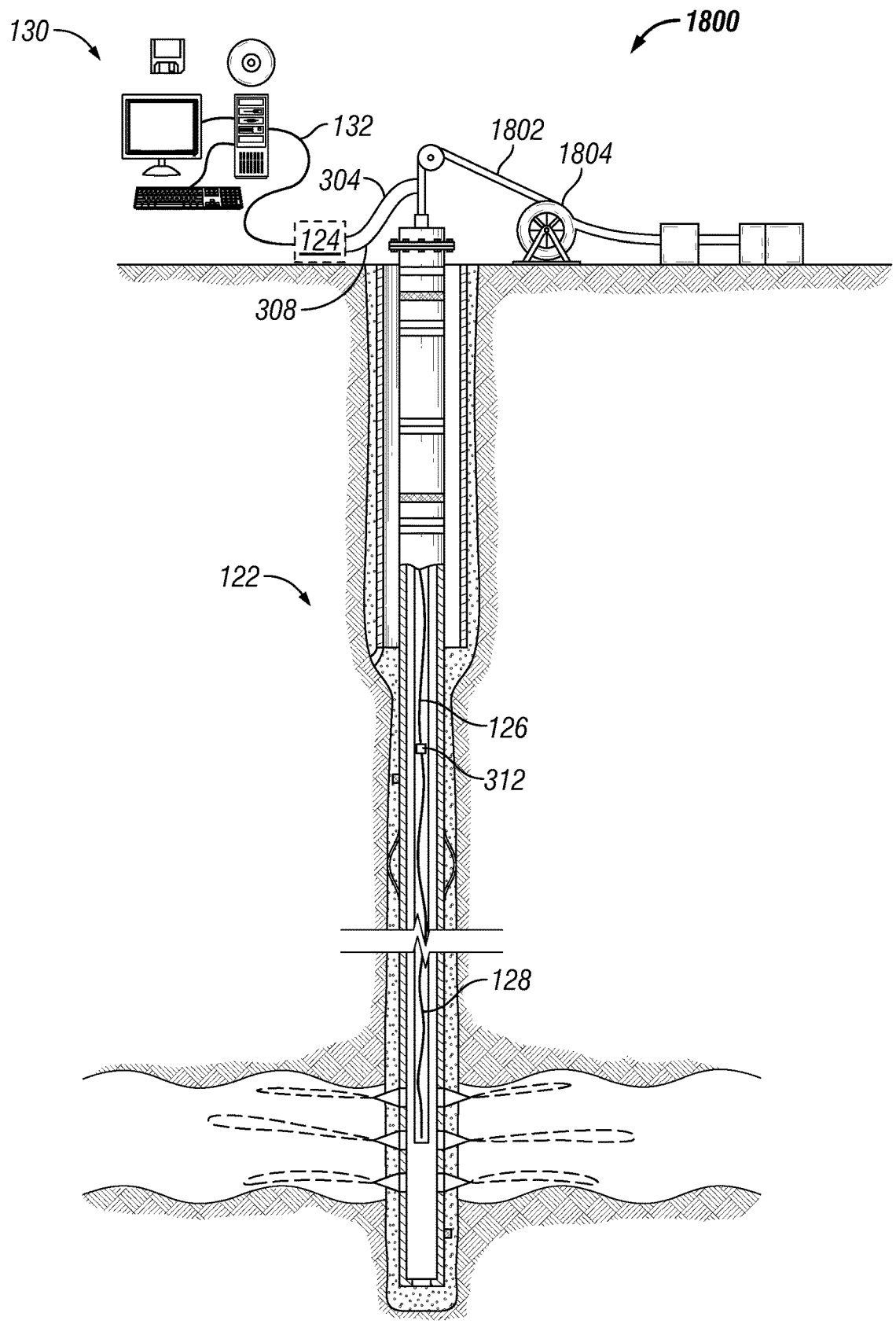
FIG. 18 illustrates an example of the well measurement system in a land-based operation.

Downhole fiber 128 may be permanently deployed in a wellbore via single- or dual-trip completion strings, behind casing, on tubing, or in pumped down installations. In examples, downhole fiber 128 may be temporarily deployed via coiled tubing, wireline, slickline, or disposable cables. FIGS. 17A-17D illustrate different types of deployment of downhole fiber 128 in wellbore 122 (e.g., referring to FIG. 1). As illustrated in FIG. 17A, wellbore 122 deployed in formation 104 may include surface casing 1700 in which production casing 1702 may be deployed. Additionally, production tubing 1704 may be deployed within production casing 1702. In this example, downhole fiber 128 may be temporarily deployed in a wireline system in which a bottom hole gauge 1708 is connected to the distal end of downhole fiber 128. Further illustrated, downhole fiber 128 may be coupled to a fiber connection 1706. Without limitation, fiber connection 1706 may attach downhole fiber 128 to umbilical line 126 (e.g., referring to FIG. 1). Fiber connection 1906 may operate with an optical feedthrough system (itself comprising a series of wet- and dry-mate optical connectors) in the wellhead that optically couples downhole fiber 128 from the tubing hanger, to umbilical line 126 on the wellhead instrument panel. Umbilical line 126 may consist of an optical flying lead, optical distribution system(s), umbilical termination unit(s), and transmission fibers encapsulated in flying leads, flow lines, rigid risers, flexible risers, and/or one or more umbilical lines. This may allow for umbilical line 126 to connect and disconnect from downhole fiber 128 while preserving optical continuity between the umbilical line 126 and the downhole fiber 128.

FIG. 17B illustrates a permeant deployment of downhole fiber 128. As illustrated in wellbore 122 deployed in formation 104 may include surface casing 1700 in which production casing 1702 may be deployed. Additionally, production tubing 1704 may be deployed within production casing 1702. In examples, downhole fiber 128 is attached to the outside of production tubing 1704 by one or more cross-coupling protectors 1710. Without limitation, cross-coupling protectors 1710 may be evenly spaced and may be disposed on every other joint of production tubing 1704. Further illustrated, downhole fiber 128 may be coupled to fiber connection 1706 at one end and bottom hole gauge 1708 at the opposite end.

FIG. 17C illustrates a permeant deployment of downhole fiber 128. As illustrated in wellbore 122 deployed in formation 104 may include surface casing 1700 in which production casing 1702 may be deployed. Additionally, production tubing 1704 may be deployed within production casing 1702. In examples, downhole fiber 128 is attached to the outside of production casing 1702 by one or more cross-coupling protectors 1710. Without limitation, cross-coupling protectors 1710 may be evenly spaced and may be disposed on every other joint of production tubing 1704. Further illustrated, downhole fiber 128 may be coupled to fiber connection 1706 at one end and bottom hole gauge 1708 at the opposite end.

FIG. 17D illustrates a coiled tubing operation in which downhole fiber 128 may be deployed temporarily. As illustrated in FIG. 17D, wellbore 122 deployed in formation 104 may include surface casing 1700 in which production casing 1702 may be deployed. Additionally, coiled tubing 1712 may be deployed within production casing 1702. In this example, downhole fiber 128 may be temporarily deployed in a coiled tubing system in which a bottom hole gauge 1708 is connected to the distal end of downhole fiber. Further illustrated, downhole fiber 128 may be attached to coiled tubing 1712, which may move downhole fiber 128 through production casing 1702. Further illustrated, downhole fiber 128 may be coupled to fiber connection 1706 at one end and bottom hole gauge 1708 at the opposite end. During operations, downhole fiber 128 may be used to take measurements within wellbore 122, which may be transmitted to the surface and/or interrogator 124 (e.g., referring to FIG. 1) in the DAS system.

Additionally, within the DAS system, interrogator 124 may be connected to an information handling system 130 through connection 132, which may be wired and/or wireless. IT should be noted that both information handling system 130 and interrogator 124 are disposed on floating vessel 102. Both systems and methods of the present disclosure may be implemented, at least in part, with information handling system 130. Information handling system 130 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 130 may be a processing unit 134, a network storage device, or any other suitable device and may vary in size, shape, performance, functionality, and price. Information handling system 130 may include random access memory (RAM), one or more processing resources such as a central processing unit (CPU) or hardware or software control logic, ROM, and/or other types of nonvolatile memory. Additional components of the information handling system 130 may include one or more disk drives, one or more network ports for communication with external devices as well as an input device 136 (e.g., keyboard, mouse, etc.) and video display 138. Information handling system 130 may also include one or more buses operable to transmit communications between the various hardware components.

Alternatively, systems and methods of the present disclosure may be implemented, at least in part, with non-transitory computer-readable media 140. Non-transitory computer-readable media 140 may include any instrumentality or aggregation of instrumentalities that may retain data and/or instructions for a period of time. Non-transitory computer-readable media 140 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

Production operations in a subsea environment present optical challenges for DAS. For example, a maximum pulse power that may be used in DAS is approximately inversely proportional to fiber length due to optical non-linearities in the fiber. Therefore, the quality of the overall signal is poorer with a longer fiber than a shorter fiber. This may impact any operation that may utilize the DAS since the distal end of the fiber actually contains the interval of interest (i.e., the reservoir) in which downhole fiber 128 may be deployed. The interval of interest may include wellbore 122 and formation 104. For pulsed DAS systems such as the one exemplified in FIG. 3, an additional challenge is the drop-in signal to noise ratio (SNR) associated with the decrease in the number of light pulses that may be launched into the fiber per second (pulse rate) when interrogating fibers with overall lengths exceeding 10 km. As such, utilizing DAS in a subsea environment may have to increase the returned signal strength with given pulse power, increase the maximum pulse power that may be used for given fiber optic cable length, maintain the pulse power as high as possible as it propagates down the fiber optic cable length, and increase the number of light pulses that may be launched into the fiber optic cable per second.

FIG. 20 illustrates a land-based well system 2000, which illustrates a coiled tubing operation. Without limitation, while a coiled tubing operation is shown, a wireline operation and/or the like may be utilized. As illustrated interrogator 124 is attached to information handling system 130. Further discussed below, lead lines may connect umbilical line 126 to interrogator 124. Umbilical line 126 may include a first fiber optic cable 304 and a second fiber optic cable 308 which may be individual lead lines. Without limitation, first fiber optic cable 304 and a second fiber optic cable 308 may attach to coiled tubing 2002 as umbilical line 126. Umbilical line 126 may traverse through wellbore 122 attached to coiled tubing 2002. In examples, coiled tubing 2002 may be spooled within hoist 2004. Hoist 2004 may be used to raise and/or lower coiled tubing 2002 in wellbore 122. Further illustrated in FIG. 20, umbilical line 126 may connect to distal circulator 312, further discussed below. Distal circulator 312 may connect umbilical line 126 to downhole fiber 128.

Figure 2:
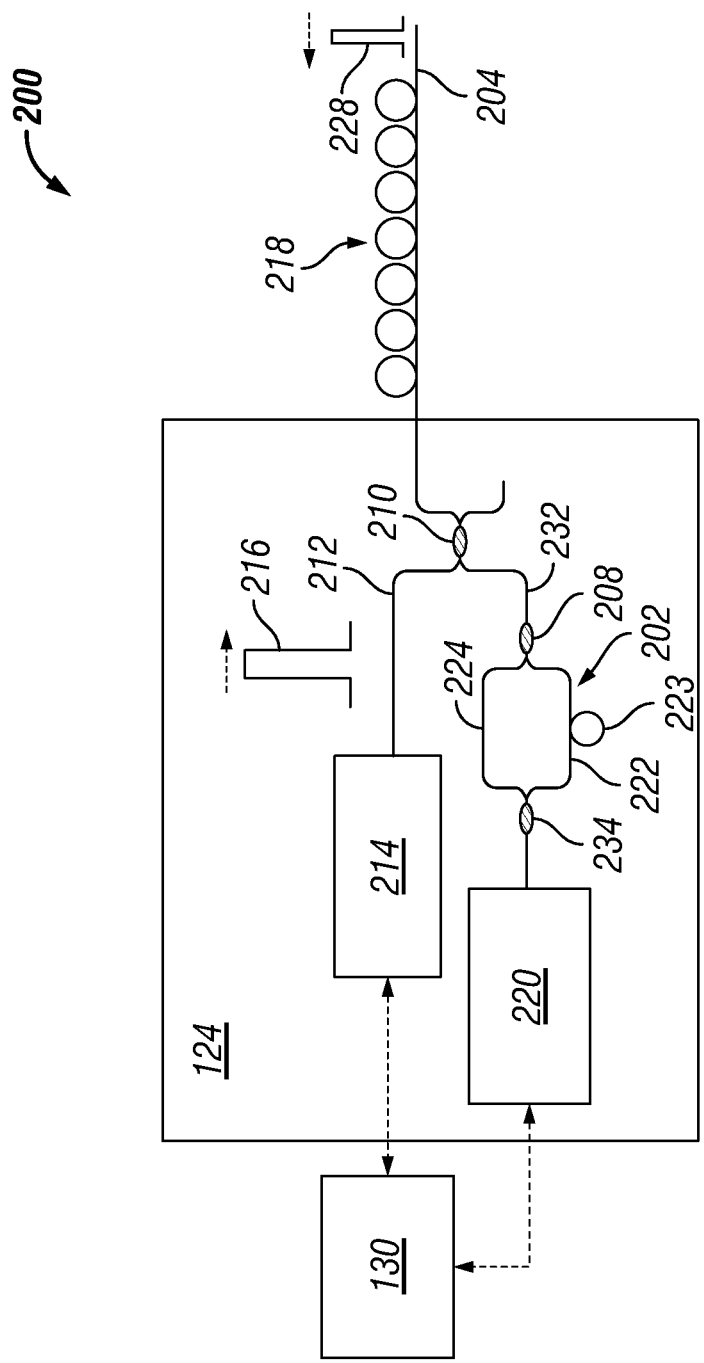
FIG. 2 illustrates an example of a DAS system.

FIG. 2 illustrates an example of DAS system 200. DAS system 200 may include information handling system 130 that is communicatively coupled to interrogator 124. Without limitation, DAS system 200 may comprise a single-pulse coherent Rayleigh scattering system with a compensating interferometer. In examples, DAS system 200 may be used for phase-based sensing of events in a wellbore using measurements of coherent Rayleigh backscatter or may interrogate a fiber optic line containing an array of partial reflectors, for example, fiber Bragg gratings.

As illustrated in FIG. 2, interrogator 124 may include a pulse generator 214 coupled to a first coupler 210 using an optical fiber 212. Pulse generator 214 may be a laser, or a laser connected to at least one amplitude modulator, or a laser connected to at least one switching amplifier, i.e., semiconductor optical amplifier (SOA). First coupler 210 may be a traditional fused type fiber optic splitter, a circulator, a PLC fiber optic splitter, or any other type of splitter known to those with ordinary skill in the art. Pulse generator 214 may be coupled to optical gain elements (not shown) to amplify pulses generated therefrom. Example optical gain elements include, but are not limited to, Erbium Doped Fiber Amplifiers (EDFAs) or Semiconductor Optical Amplifiers (SOAs).

DAS system 200 may comprise an interferometer 202. Without limitations, interferometer 202 may include a Mach-Zehnder interferometer. For example, a Michelson interferometer or any other type of interferometer 202 may also be used without departing from the scope of the present disclosure. Interferometer 202 may comprise a top interferometer arm 224, a bottom interferometer arm 222, and a gauge 223 positioned on bottom interferometer arm 222. Interferometer 202 may be coupled to first coupler 210 through a second coupler 208 and an optical fiber 232. Interferometer 202 further may be coupled to a photodetector assembly 220 of DAS system 200 through a third coupler 234 opposite second coupler 208. Second coupler 208 and third coupler 234 may be a traditional fused type fiber optic splitter, a PLC fiber optic splitter, or any other type of optical splitter known to those with ordinary skill in the art. Photodetector assembly 220 may include associated optics and signal processing electronics (not shown). Photodetector assembly 220 may be a semiconductor electronic device that uses the photoelectric effect to convert light to electricity. Photodetector assembly 220 may be an avalanche photodiode or a pin photodiode but is not intended to be limited to such.

When operating DAS system 200, pulse generator 214 may generate a first optical pulse 216 which is transmitted through optical fiber 212 to first coupler 210. First coupler 210 may direct first optical pulse 216 through a fiber optical cable 204. It should be noted that fiber optical cable 204 may be included in umbilical line 126 and/or downhole fiber 128 (e.g., FIG. 1). As illustrated, fiber optical cable 204 may be coupled to first coupler 210. As first optical pulse 216 travels through fiber optical cable 204, imperfections in fiber optical cable 204 may cause a portion of the light to be backscattered along fiber optical cable 204 due to Rayleigh scattering. Scattered light according to Rayleigh scattering is returned from every point along fiber optical cable 204 along the length of fiber optical cable 204 and is shown as backscattered light 228 in FIG. 2. This backscatter effect may be referred to as Rayleigh backscatter. Density fluctuations in fiber optical cable 204 may give rise to energy loss due to the scattered light, $\alpha_{scat}$, with the following coefficient:

$$\alpha_{scat} = \frac{8\pi^3}{3\lambda^4} n^8 p^2 k T_f \beta \tag{1}$$

where n is the refraction index, p is the photoelastic coefficient of fiber optical cable 204, k is the Boltzmann constant, and $\beta$ is the isothermal compressibility. $T_f$ is a fictive temperature, representing the temperature at which the density fluctuations are "frozen" in the material. fiber optical cable 204 may be terminated with a low reflection device (not shown). In examples, the low reflection device (not shown) may be a fiber coiled and tightly bent to violate Snell's law of total internal reflection such that all the remaining energy is sent out of fiber optical cable 204.

Backscattered light 228 may travel back through fiber optical cable 204, until it reaches second coupler 208. First coupler 210 may be coupled to second coupler 208 on one side by optical fiber 232 such that backscattered light 228 may pass from first coupler 210 to second coupler 208 through optical fiber 232. Second coupler 208 may split backscattered light 228 based on the number of interferometer arms so that one portion of any backscattered light 228 passing through interferometer 202 travels through top interferometer arm 224 and another portion travels through bottom interferometer arm 222. Therefore, second coupler 208 may split the backscattered light from optical fiber 232 into a first backscattered pulse and a second backscattered pulse. The first backscattered pulse may be sent into top interferometer arm 224. The second backscattered pulse may be sent into bottom interferometer arm 222. These two portions may be re-combined at third coupler 234, after they have exited interferometer 202, to form an interferometric signal.

Interferometer 202 may facilitate the generation of the interferometric signal through the relative phase shift variations between the light pulses in top interferometer arm 224 and bottom interferometer arm 222. Specifically, gauge 223 may cause the length of bottom interferometer arm 222 to be longer than the length of top interferometer arm 224. With different lengths between the two arms of interferometer 202, the interferometric signal may include backscattered light from two positions along fiber optical cable 204 such that a phase shift of backscattered light between the two different points along fiber optical cable 204 may be identified in the interferometric signal. The distance between those points L may be half the length of the gauge 223 in the case of a Mach-Zehnder configuration, or equal to the gauge length in a Michelson interferometer configuration.

While DAS system 200 is running, the interferometric signal will typically vary over time. The variations in the interferometric signal may identify strains in fiber optical cable 204 that may be caused, for example, by seismic energy. By using the time of flight for first optical pulse 216, the location of the strain along fiber optical cable 204 and the time at which it occurred may be determined. If fiber optical cable 204 is positioned within a wellbore, the locations of the strains in fiber optical cable 204 may be correlated with depths in the formation in order to associate the seismic energy with locations in the formation and wellbore.

To facilitate the identification of strains in fiber optical cable 204, the interferometric signal may reach photodetector assembly 220, where it may be converted to an electrical signal. The photodetector assembly may provide an electric signal proportional to the square of the sum of the two electric fields from the two arms of the interferometer. This signal is proportional to.

$$P(t)=P_1+P_2+2*Sqrt(P_1 P_2)\cos(\phi_1-\phi_2) \quad (2)$$

where $P_n$ is the power incident to the photodetector from a particular arm (1 or 2) and $\phi_n$ is the phase of the light from the particular arm of the interferometer. Photodetector assembly 220 may transmit the electrical signal to information handling system 130, which may process the electrical signal to identify strains within fiber optical cable 204 and/or convey the data to a display and/or store it in computer-readable media. Photodetector assembly 220 and information handling system 130 may be communicatively and/or mechanically coupled. Information handling system 130 may also be communicatively or mechanically coupled to pulse generator 214.

Modifications, additions, or omissions may be made to FIG. 2 without departing from the scope of the present disclosure. For example, FIG. 2 shows a particular configuration of components of DAS system 200. However, any suitable configurations of components may be used. For example, pulse generator 214 may generate a multitude of coherent light pulses, optical pulse 216, operating at distinct frequencies that are launched into the sensing fiber either simultaneously or in a staggered fashion. For example, the photo detector assembly is expanded to feature a dedicated photodetector assembly for each light pulse frequency. In examples, a compensating interferometer may be placed in the launch path (i.e., prior to traveling down fiber optical cable 204) of the interrogating pulse to generate a pair of pulses that travel down fiber optical cable 204. In examples, interferometer 202 may not be necessary to interfere the backscattered light from pulses prior to being sent to photo detector assembly. In one branch of the compensation interferometer in the launch path of the interrogating pulse, an extra length of fiber not present in the other branch (a gauge length similar to gauge 223 of FIG. 1) may be used to delay one of the pulses. To accommodate phase detection of backscattered light using DAS system 200, one of the two branches may include an optical frequency shifter (for example, an acousto-optic modulator) to shift the optical frequency of one of the pulses, while the other may include a gauge. This may allow using a single photodetector receiving the backscatter light to determine the relative phase of the backscatter light between two locations by examining the heterodyne beat signal received from the mixing of the light from different optical frequencies of the two interrogation pulses.

In examples, DAS system 200 may generate interferometric signals for analysis by the information handling system 430 without the use of a physical interferometer. For instance, DAS system 200 may direct backscattered light to photodetector assembly 220 without first passing it through any interferometer, such as interferometer 202 of FIG. 2. Alternatively, the backscattered light from the interrogation pulse may be mixed with the light from the laser originally providing the interrogation pulse. Thus, the light from the laser, the interrogation pulse, and the backscattered signal may all be collected by photodetector 220 and then analyzed by information handling system 130. The light from each of these sources may be at the same optical frequency in a homodyne phase demodulation system, or may be different optical frequencies in a heterodyne phase demodulator. This method of mixing the backscattered light with a local oscillator allows measuring the phase of the backscattered light along the fiber relative to a reference light source.

Figure 3:
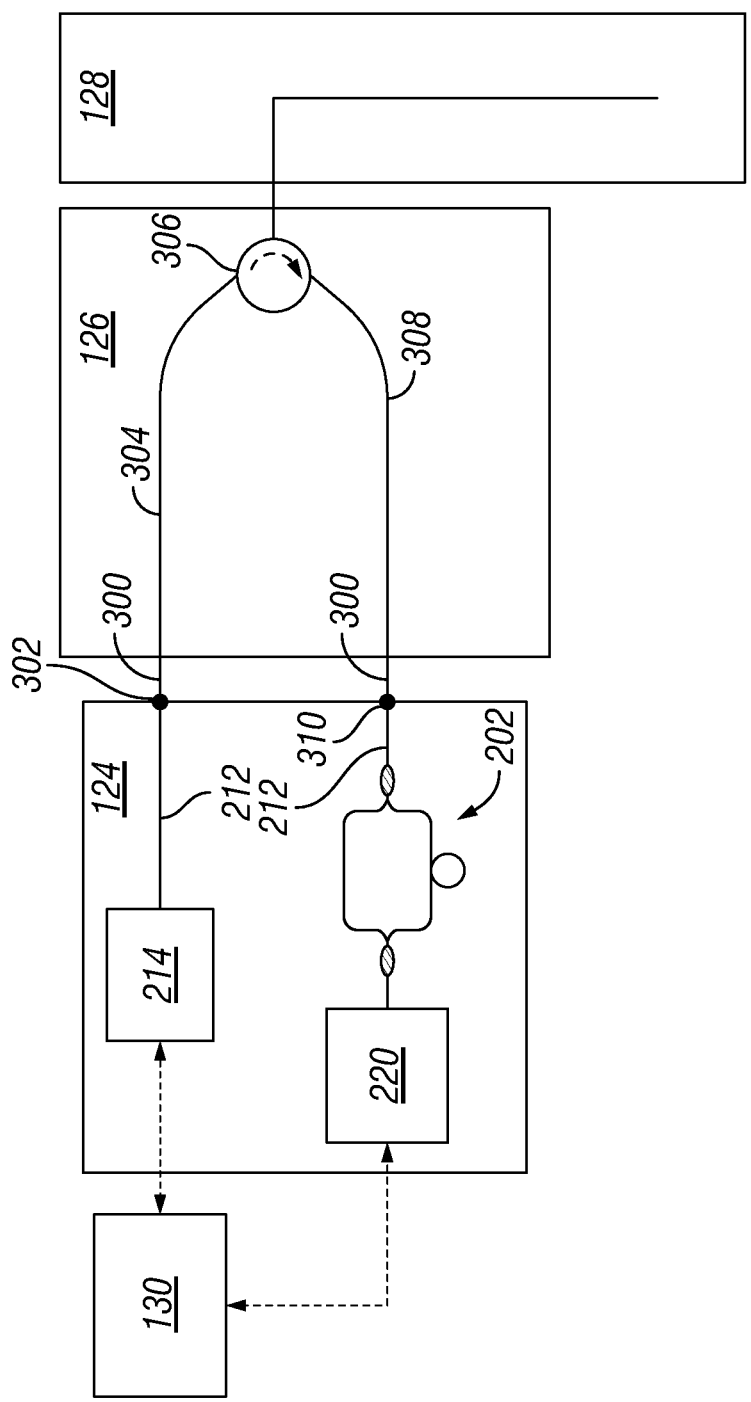
FIG. 3 illustrate the DAS system with lead lines.

FIG. 3 illustrates DAS 200, which may be utilized to overcome challenges presented by a subsea environment. DAS system 200 may include interrogator 124, umbilical line 126, and downhole fiber 128. As illustrated, interrogator 124 may include pulse generator 214 and photodetector assembly 220, both of which may be communicatively coupled to information handling system 130. Additionally, interferometers 202 may be placed within interrogator 124 and operate and/or function as described above. FIG. 3 illustrates and example of DAS system 200 in which lead lines 300 may be used. As illustrated, an optical fiber 212 may attach pulse generator 214 to an output 302, which may be a fiber optic connector. Umbilical line 126 may attach to output 302 with a first fiber optic cable 304. First fiber optic cable 304 may traverse the length of umbilical line 126 to a remote circulator 306. Remote circulator 306 may connect first fiber optic cable 304 to second fiber optic cable 308. In examples, remote circulator 306 functions to steer light unidirectionally between one or more input and outputs of remote circulator 306. Without limitation, remote circulators 306 are three-port devices wherein light from a first port is split internally into two independent polarization states and wherein these two polarization states are made to propagate two different paths inside remote circulator 306. These two independent paths allow one or both independent light beams to be rotated in polarization state via Faraday the effect in optical media. Polarization rotation of the light propagating through free space optical elements within the circulator thus allows the total optical power of the two independent beams to uniquely emerge together with the same phase relationship from a second port of remote circulator 306.

Conversely, if any light enters the second port of remote circulator 306 in the reverse direction, the internal free space optical elements within remote circulator 306 may operate identically on the reverse direction light to split it into two polarizations states. After appropriate rotation of polarization states, these reverse in direction polarized light beams, are recombined, as in the forward propagation case, and emerge uniquely from a third port of remote circulator 306 with the same phase relationship and optical power as they had before entering remote circulator 306. Additionally, as discussed below, remote circulator 306 may act as a gateway, which may only allow chosen wavelengths of light to pass through remote circulator 306 and pass to downhole fiber 128. Second fiber optic cable 308 may attach umbilical line 126 to input 309. Input 309 may be a fiber optic connector which may allow backscatter light to pass into interrogator 124 to interferometer 202. Interferometer 202 may operate and function as described above and further pass back scatter light to photodetector assembly 220.

Figure 4:
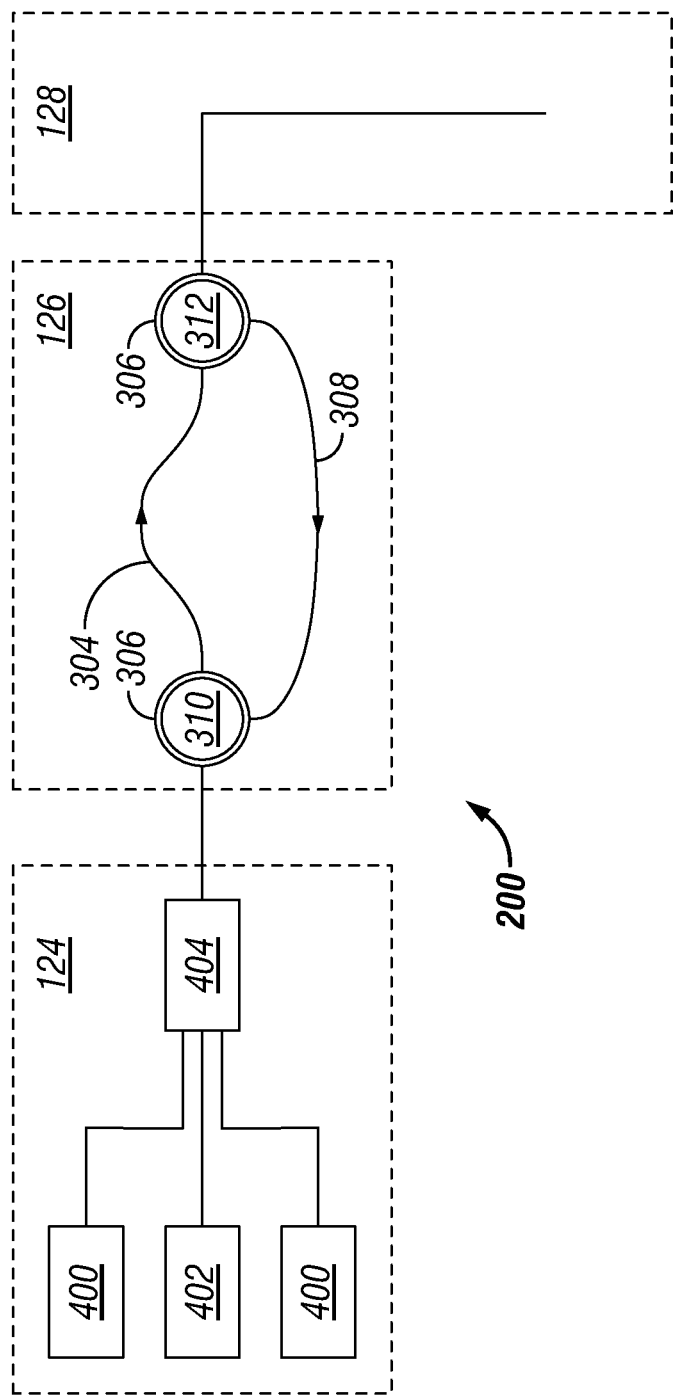
FIG. 4 illustrates a schematic of another DAS system.

FIG. 4 illustrates another example of DAS system 200. As illustrated, interrogator 124 may include one or more DAS interrogator units 400, each emitting coherent light pulses at a distinct optical wavelength, and a Raman Pump 402 connected to a wavelength division multiplexer 404 (WDM) with fiber stretcher. Without limitation, WDM 404 may include a multiplexer assembly that multiplexes the light received from the one or more DAS interrogator units 400 and a Raman Pump 402 onto a single optical fiber and a demultiplexer assembly that separates the multi-wavelength backscattered light into its individual frequency components and redirects each single-wavelength backscattered light stream back to the corresponding DAS interrogator unit 400. In an example, WDM 404 may utilize an optical add-drop multiplexer to enable multiplexing the light received from the one or more DAS interrogator units 400 and a Raman Pump 402 and demultiplexing the multi-wavelength backscattered light received from a single fiber. WDM 404 may also include circuitry to optically amplify the multi-frequency light prior to launching it into the signal optical fiber and/or optical circuitry to optically amplify the multi-frequency backscattered light returning from the single optical fiber, thereby compensating for optical losses introduced during optical (de-)multiplexing. Raman Pump 402 may be a co-propagating optical pump based on stimulated Raman scattering, to feed energy from a pump signal to a main pulse from one or more DAS interrogator units 400 as the main pulse propagates down one or more fiber optic cables. This may conservatively yield a 3 dB improvement in SNR. As illustrated, Raman Pump 402 is located in interrogator 124 for co-propagation. In another example, Raman Pump 402 may be located topside after one or more remote circulators 306 either in line with first fiber optic cable 304 (co-propagation mode) or in line with second fiber optic cable 308 (counter-propagation). In another example, Raman Pump 402 is marinized and located after distal circulator 312 configured either for co-propagation or counter-propagation. In still another example, the light emitted by the Raman Pump 402 is remotely reflected by using a wavelength-selective filter beyond a remote circulator in order to provide amplification in the return path using a Raman Pump 402 in any of the topside configurations outlined above.

Further illustrated in FIG. 4, WDM 404 with fiber stretcher may attach proximal circulator 310 to umbilical line 126. Umbilical line 126 may include one or more remote circulators 306, a first fiber optic cable 304, and a second fiber optic cable 308. As illustrated, a first fiber optic cable 304 and as second fiber optic cable 308 may be separate and individual fiber optic cables that may be attached at each end to one or more remote circulators 306. In examples, first fiber optic cable 304 and second fiber optic cable 308 may be different lengths or the same length and each may be an ultra-low loss transmission fiber that may have a higher power handling capability before non-literarily. This may enable a higher gain, co-propagation Raman amplification from interrogator 124.

Deploying first fiber optic cable 304 and as second fiber optic cable 308 from floating vessel 102 (e.g., referring to FIG. 1) to a subsea environment to a distal-end passive optical circulator arrangement, enables downhole fiber 128, which is a sensing fiber, to be below a remote circulator 306 (e.g., well-only) that may be at the distal end of DAS system 200. Higher (2-3x) pulse repetition rates, and non-saturated (non-back reflected) optical receivers may also be adjusted such that their dynamic range is optimized for downhole fiber 128. This may approximately yield a 3.5 dB improvement in SNR. Additionally, downhole fiber 128 may be a sensing fiber that has higher Rayleigh scattering coefficient (i.e., higher doping) which may be result in a ten times improvement in backscatter, which may yield a 7-dB improvement in SNR. In examples, remote circulators 306 may further be categorized as a proximal circulator 310 and a distal circulator 312. Proximal circulator 310 is located closer to interrogator 124 and may be located on floating vessel 102 or within umbilical line 126. Distal circulator 312 may be further away from interrogator 124 than proximal circulator 310 and may be located in umbilical line 126 or within wellbore 122 (e.g., referring to FIG. 1). As discussed above, a configuration illustrated in FIG. 3 may not utilize a proximal circulator 310 with lead lines 300.

Figure 5:
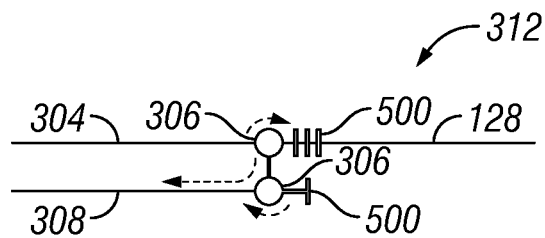
FIG. 5 illustrates a remote circulator arrangement.

FIG. 5 illustrates another example of distal circulator 312, which may include two remote circulators 306. As illustrated, each remote circulator 306 may function and operate to avoid overlap, at interrogator 124, of backscattered light from two different pulses. For example, during operations, light at a first wavelength may travel from interrogator 124 down first fiber optic cable 304 to a remote circulator 306. As the light passes through remote circulator 306 the light may encounter a Fiber Bragg Grating 500. In examples, Fiber Bragg Grating 500 may be referred to as a filter mirror that may be a wavelength specific high reflectivity filter mirror or filter reflector that may operate and function to recirculate unused light back through the optical circuit for "double-pass" co/counter propagation induced DAS signal gain at 1550 nm. In examples, this wavelength specific "Raman light" mirror may be a dichroic thin film interference filter, Fiber Bragg Grating 500, or any other suitable optical filter that passes only the 1550 nm forward propagating DAS interrogation pulse light while simultaneously reflecting most of the residual Raman Pump light.

Without limitation, Fiber Bragg Grating 500 may be set-up, fabricated, altered, and/or the like to allow only certain selected wavelengths of light to pass. All other wavelengths may be reflected back and two the second remote circulator, which may send the reflected wavelengths of light along second fiber optic cable 308 back to interrogator 124. This may allow Fiber Bragg Grating 500 to split DAS system 200 (e.g., referring to FIG. 4) into two regions. A first region may be identified as the devices and components before Fiber Bragg Grating 500 and the second region may be identified as downhole fiber 128 and any other devices after Fiber Bragg Grating 500.

Splitting DAS system 200 (e.g., referring to FIG. 4) into two separate regions may allow interrogator 124 (e.g., referring to FIG. 1) to pump specifically for an identified region. For example, the disclosed system of FIG. 4 may include one or more pumps, as described above, placed in interrogator 124 or after proximal circulator 310 at the topside either in line with first fiber optic cable 304 or second fiber optic cable 308 that may emit a wavelength of light that may travel only to a first region and be reflected by Fiber Bragg Grating 500. A second pump may emit a wavelength of light that may travel to the second region by passing through Fiber Bragg Grating 500. Additionally, both the first pump and second pump may transmit at the same time. Without limitation, there may be any number of pumps and any number of Fiber Bragg Gratings 500 which may be used to control what wavelength of light travels through downhole fiber 128. FIG. 5 also illustrates Fiber Bragg Gratings 500 operating in conjunction with any remote circulator 306, whether it is a distal circulator 312 or a proximal circulator 310. Additionally, as discussed below, Fiber Bragg Gratings 500 may be attached at the distal end of downhole fiber 218. Other alterations to DAS system 200 (e.g., referring to FIG. 4) may be undertaken to improve the overall performance of DAS system 200. For example, the lengths of first fiber optic cable 304 and second fiber optic cable 308 selected to increase pulse repetition rate (expressed in terms of the time interval between pulses $t_{rep}$).

Figure 6:
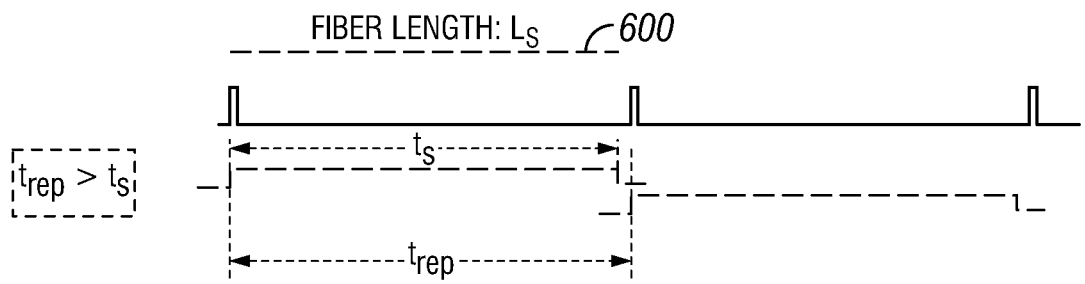
FIG. 6 illustrates a graph for determining time for a light pulse to travel in a fiber optic cable.

FIG. 6 illustrates a fiber optic cable 600 in which no remote circulator 306 may be used. As illustrated, the entire fiber optic cable 600 is a sensor and the pulse interval must be greater than the time for the pulse of light to travel to the end of fiber optic cable 600 and its backscatter to travel back to interrogator 124 (e.g., referring to FIG. 1). This is so, since in DAS systems 200 at no point in time, backscatter from more than one location along sensing fiber (i.e., downhole fiber 128) may be received. Therefore, the pulse interval $t_{rep}$ must be greater than twice the time light takes to travel "one-way" down the fiber. Let $t_s$ be the "two-way" time for light to travel to the end of fiber optic cable 600 and back, which may be written as $t_{rep} > t_s$.

Figure 7:
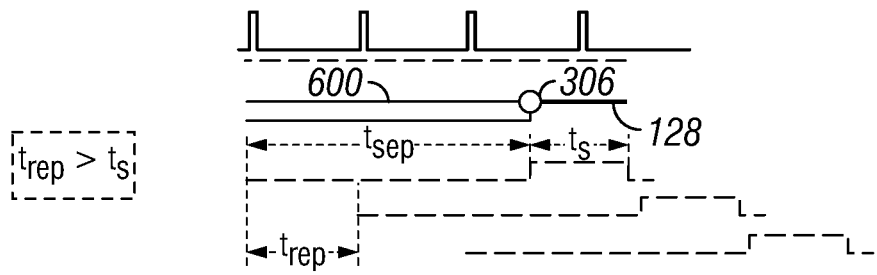
FIG. 7 illustrates another graph for determining time for a light pulse to travel in a fiber optic cable.

FIG. 7 illustrates fiber optic cable 600 with a remote circulator 306 using the configuration shown in FIG. 2. When a remote circulator 306 is used, only the light traveling in fiber optic cable 600 that is allowed to go beyond remote circulator 306 and to downhole fiber 128 may be returned to interrogator 124 (e.g., referring to FIG. 1), thus, the interval between pulses is dictated only by the length of the sensing portion, downhole fiber 128, of fiber optic cable 600. It should be noted that all light must travel "to" and "from" the sensing portion, downhole fiber 128, with respect to pulse timing, what matters is the total length of fiber "to" and "from" remote circulator 306. Therefore, first fiber optic cable 304 or second fiber optic cable 308 may be longer than the other, as discussed above.

Figure 8:
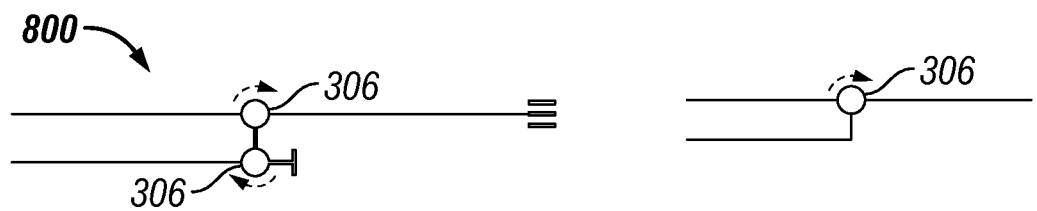
FIG. 8 illustrates the remote circulator arrangement identified a remoter circular.

FIG. 8 illustrates a remote circulator arrangement 800 which may allow, as described above, configurations that use more than one remote circulator 306 close together at the remote location. Although remote circulator arrangement 800 may have any number of remote circulators 306, remote circulator arrangement 800 may be illustrated as a single remote circulator 306.

Figure 9:
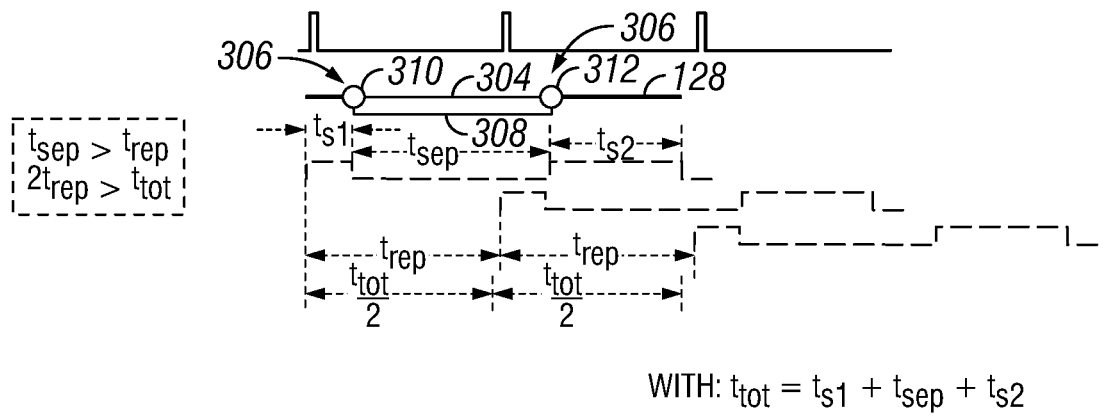
FIG. 9 illustrates another graph for determining time for a light pulse to travel in a fiber optic cable.
Figure 10A:
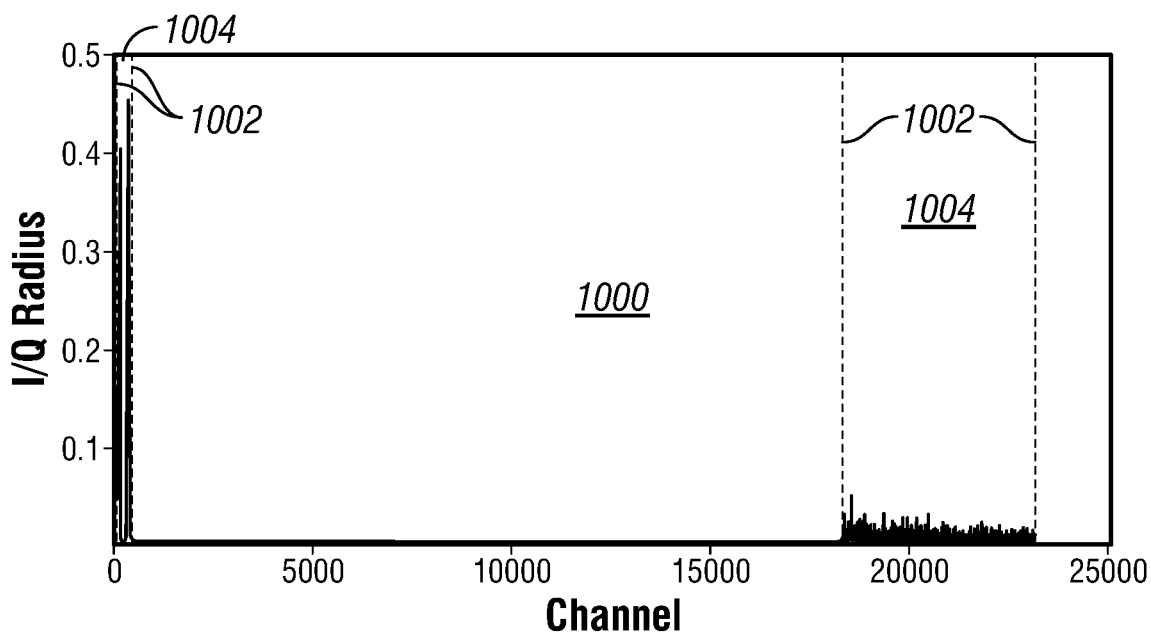
FIG. 10 illustrates a graph of sensing regions in the DAS system.
Figure 11:
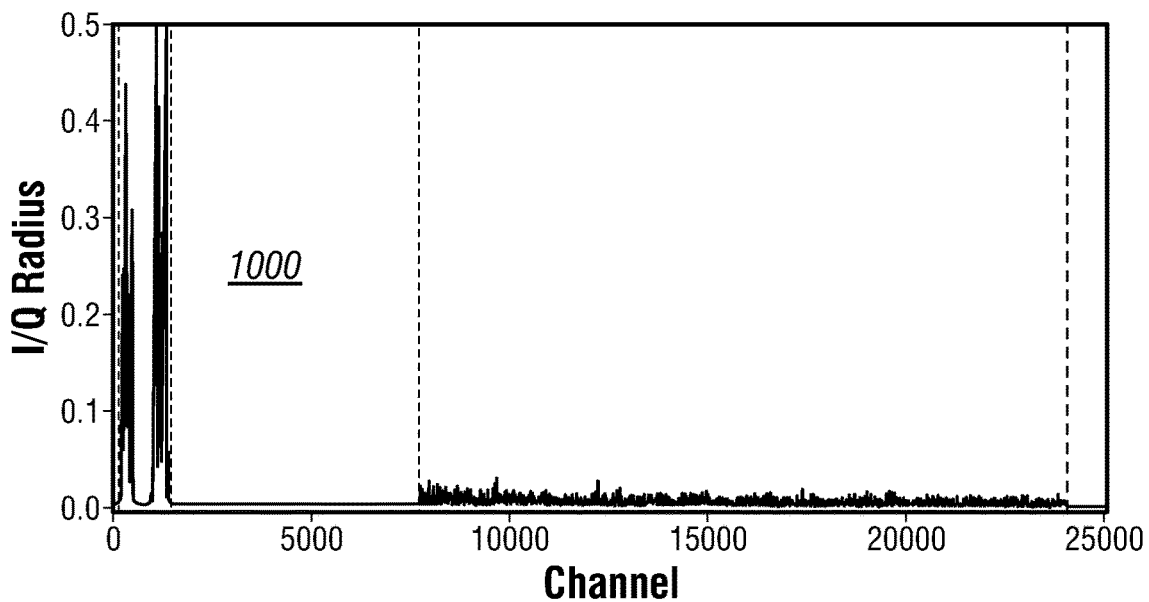
FIG. 11 illustrates a graph of optimized sampling frequencies in the DAS system.

FIG. 9 illustrates first fiber optic cable 304 and second fiber optic cable 308 attached to a remote circulator 306 at each end. As discussed above, each remote circulator may be categorized as a proximal circulator 310 and a distal circulator 312. When using a proximal circulator 310 and a distal circulator 312, light from the fiber section before proximal circulator 310, and light from the fiber section below the remote circular 306 are detected, which is illustrated in FIGS. 10 and 11. There is a gap 1000 between them of "no light" that depends on the total length of fiber (summed) between proximal circulator 310 and a distal circulator 312.

Referring back to FIG. 9, with $t_{s1}$ the duration of the light from fiber sensing section before proximal circulator 310, $t_{sep}$ the "dead time" separating the two sections (and due to the cumulative length of first fiber optic cable 304 and second fiber optic cable 308 between proximal circulator 310 and a distal circulator 312), and $t_{s2}$ the duration of the light from the sensing fiber, downhole fiber 128, beyond distal circulator 312, the constraints on fiber lengths and pulse intervals may be identified as:

i. $t_{rep} < t_{sep}$ (3)

ii. $(2t_{rep}) > (t_{s1} + t_{sep} + t_{s2})$ (4)

Criterion (i) ensures that "pulse n" light from downhole fiber 128 does not appear while "pulse n+1" light from fiber before proximal circulator 310 is being received at interrogator 124 (e.g., referring to FIG. 1). Criterion (ii) ensures that "pulse n" light from downhole fiber 128 is fully received before "pulse n+2" light from fiber before proximal circulator 310 is being received at interrogator 124 is received. It should be noted that the two criteria given above only define the minimum and maximum $t_{rep}$ for scenarios where two pulses are launched in the fiber before backscattered light below the remote circulator 306 is received. However, it should be appreciated that for those skilled in the art these criteria may be generalized to cases where n∈{1, 2, 3, . . . } light pulses may be launched in the fiber before backscattered light below the remote circulator 306 is received.

Figure 12:
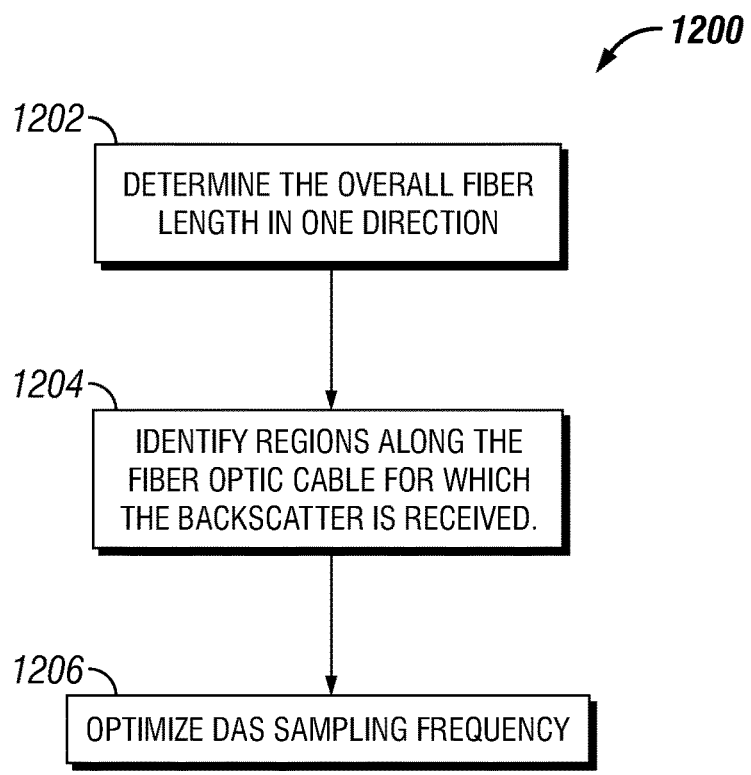
FIG. 12 illustrates a workflow for optimizing the sampling frequencies of the DAS system.

The use of remote circulators 306 may allow for DAS system 200 (e.g., referring to FIG. 2) to increase the sampling frequency. FIG. 12 illustrates workflow 1200 for optimizing sampling frequency when using a remote circulator 306 in DAS system 200. Workflow 1200 may begin with block 1202, which determines the overall fiber length in both directions. For example, a 17 km of first fiber optic cable 304 and 17 km of second fiber optic cable 308 before distal circulator 312 and 8 km of sensing fiber, downhole fiber 128, after distal circulator 312, the overall fiber optic cable length in both directions would be 50 km. Assuming a travel time of the light of 5 ns/m, the following equation may be used to calculate a first DAS sampling frequency $f_s$ $$f_s = \frac{1}{t_s} = \frac{1}{5 \cdot 10^{-9} \cdot z} \quad (5)$$

where $t_s$ is the DAS sampling interval and z is the overall two-way fiber length. Thus, for an overall two way fiber length of 50 km the first DAS sampling rate $f_s$ is 4 kHz. In block 1204 regions of the fiber optic cable are identified for which backscatter is received. For example, this is done by calculating the average optical backscattered energy for each sampling location followed by a simple thresholding scheme. The result of this step is shown in FIG. 10 where boundaries 1002 identify two sensing regions 1004. As illustrated in FIG. 10, optical energy is given as:

$$I^2 + Q^2 \quad (6)$$

where I and Q correspond to the in-phase (I) and quadrature (Q) components of the backscattered light. In block 1206, the sampling frequency of DAS system 200 is optimized. To optimize the sampling frequency a minimum time interval is found that is between the emission of light pulses such that at no point in time backscattered light arrives back at interrogator 124 (e.g., referring to FIG. 1) that corresponds to more than one spatial location along a sensing portion of the fiber-optic line. Mathematically, this may be defined as follows. Let S be the set of all spatial sample locations x along the fiber for which backscattered light is received. The desired light pulse emission interval $t_s$ is the smallest one for which the cardinality of the two sets S and {mod(x,$t_s$): x∈S} is still identical, which is expressed as:

$$\min_{t_s} (t_s) \text{ s.t.} |S| = |\{\text{mod}(x, t_s) : x \in S\}| \qquad (7)$$

where |•| is the cardinality operator, measuring the number of elements in a set. FIG. 11 shows the result of optimizing the sampling frequency from FIG. 10 with workflow 1200. Here, the DAS sampling frequency may increase from 4 kHz to 12.5 kHz without causing any overlap in backscattered locations, effectively increasing the signal to noise ratio of the underlying acoustic data by more than 5 dB due to the increase in sampling frequency.

Figure 13:
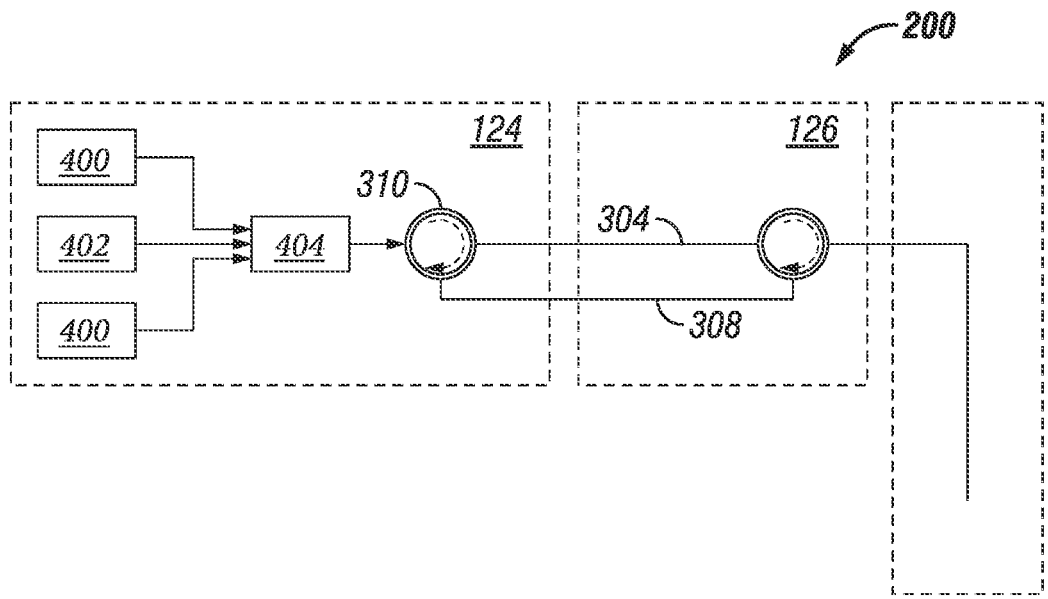
FIG. 13 illustrates another example of the DAS system.
Figure 14:
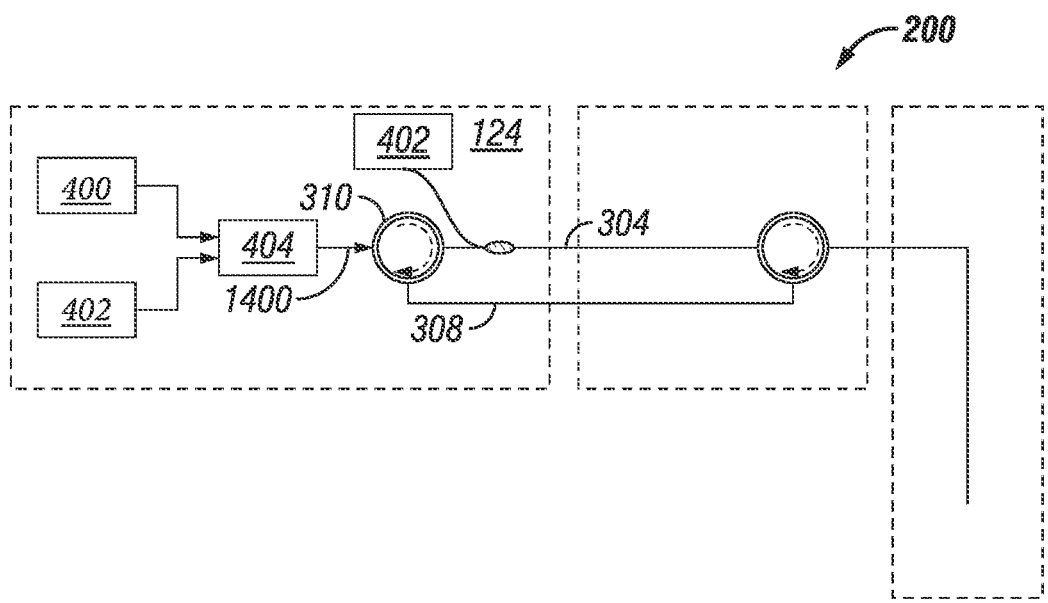
FIG. 14 illustrates another example of the DAS system.

Variants of DAS system 200 may also benefit from workflow 1200. For example, FIG. 13 illustrates DAS system 200 in which proximal circulator 310 is placed within interrogator 124. This system set up of DAS system 200 may allow for system flexibility on how to implement during measurement operations and the efficient placement of Raman Pump 402. As illustrated in FIGS. 13 and 14, first fiber optic cable 304 and second fiber optic cable 308 may connect interrogator 124 to umbilical line 126, which is described in greater detail above in FIG. 3.

FIG. 14 illustrates another example of DAS system 200 in which Raman Pump 402 is operated in co-propagation mode and is attached to first fiber optic cable 304 after proximal circulator 310. For example, f the first sensing region before proximal circulator 310 should not be affected by Raman amplification. Moreover, Raman Pump 402, may also be attached to second fiber optic cable 308 which may allow the Raman Pump 402 to be operated in counter-propagation mode. In examples, the Raman Pump may also be attached to fiber 1400 between WDM 404 and proximal circulator 310 in interrogator 124.

Figure 15:
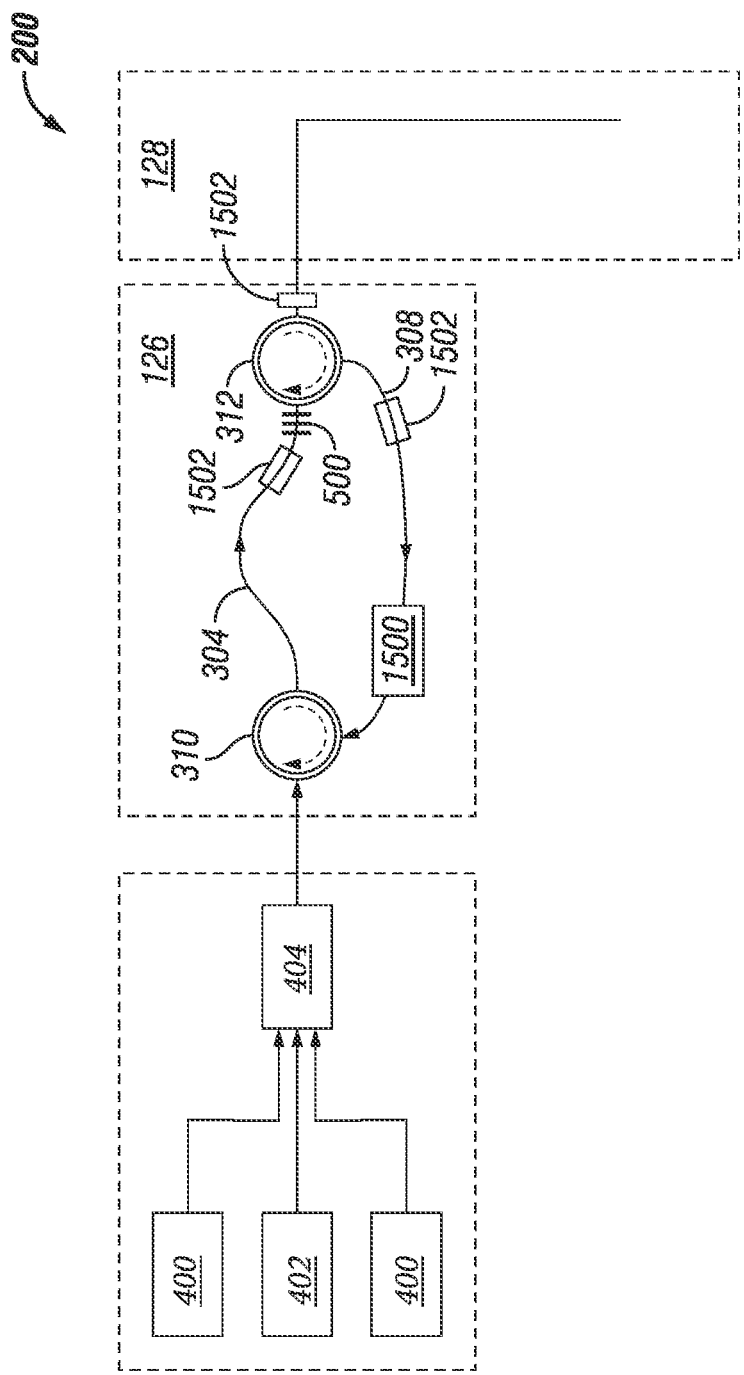
FIG. 15 illustrates another example of the DAS system.

FIG. 15 illustrates another example of DAS system 200 in which an optical amplifier assembly 1500 (i.e., an Erbium doped fiber amplifier (EDFA)+Fabry-Perot filter) may be attached to proximal circulator 310, which may also be identified as a proximal locally pumped optical amplifier. In examples, a distal optical amplifier assembly 1502 may also be attached at distal circulator 312 on first fiber optical cable 304 or second fiber optical cable 308 as an inline or "mid-span" amplifier. In examples, optical amplifier assembly 1500 and/or distal optical amplifier assembly 1502 may function to amplify backscattered light from downhole fiber 128, located below distal circulator 312, which tends to suffer from much stronger attenuation as it travels back along downhole fiber 128 and second fiber optical cable 308 than backscattered light originating from shallower sections of fiber optic cable that may also perform sensing functions. Further illustrated Fiber Bragg Grating 500 may also be disposed on first fiber optical cable 304 between distal optical amplifier assembly 1502 and distal circulator 312.

Figure 16:
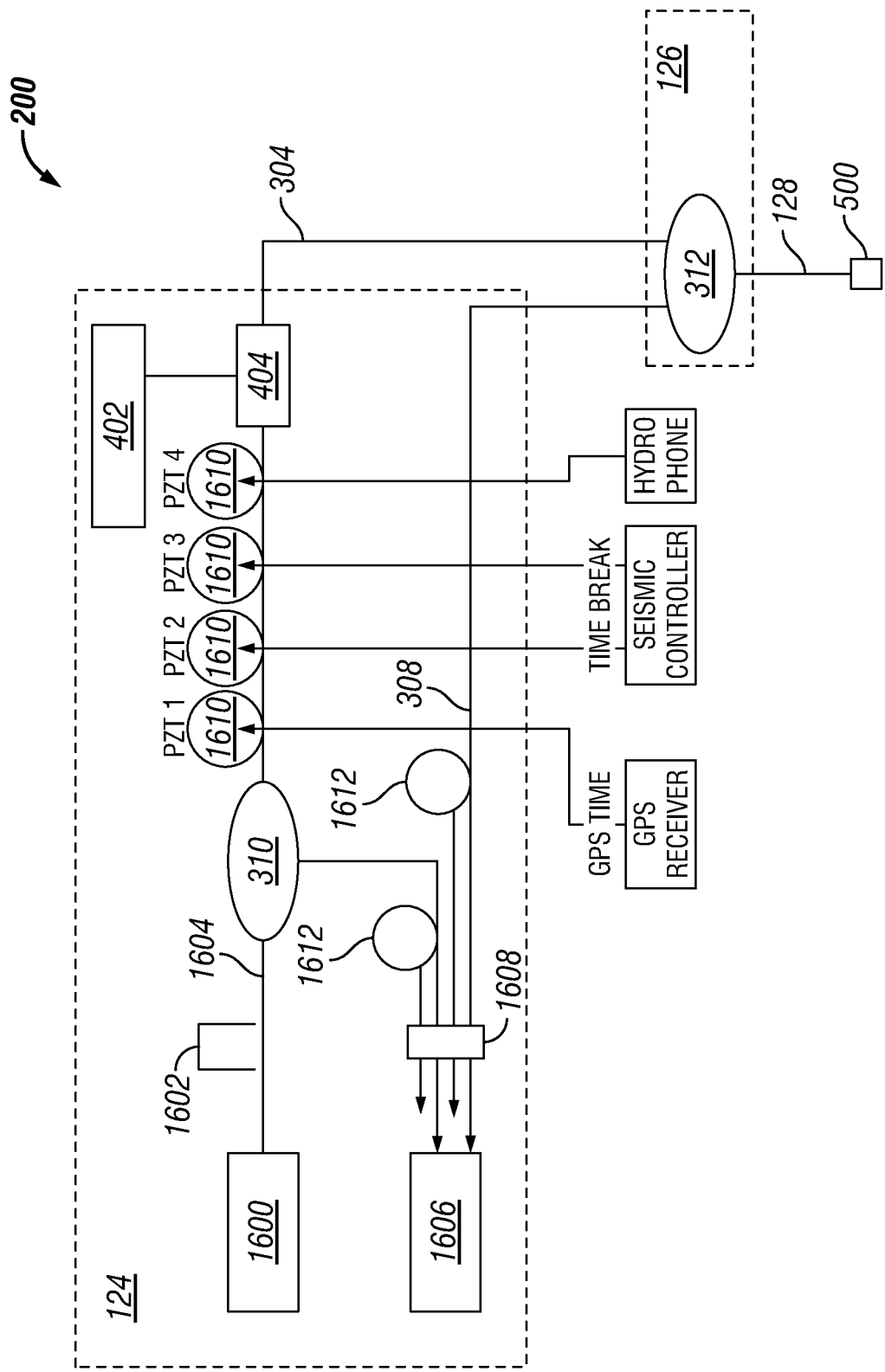
FIG. 16 illustrates a schematic of an interrogator in the DAS system.

FIG. 16 illustrates a schematic view of interrogator 124. As illustrated interrogator 124 may be connected to umbilical line 126 and downhole fiber 128 to form DAS system 200. As illustrated, umbilical line 126 may include any number of distal circulators 312 and downhole fiber 128 may include an optional Raman Mirror, which may also be referred to as Fiber Bragg Grating 500.

Interrogator 124 may include one or more lasers 1600. Lasers 1600 may be multiplexing laser, which may operate by multiplexing a plurality coherent laser sources via a WDM 404. One or more lasers 1600 may emit a light pulse 1602, which may be of a modified pulse shape. Optical pulse shaping and pre-distortion methods may be employed to increase overall optical power that may be launched into a fiber string 1604, which may connect one or more lasers 1600 to proximal circulator 310. Light pulse 1602 may travel from proximal circulator 310 through first fiber optic cable 304 to WDM 404, which may be attached to a Raman Pump 402 at the opposite end, and to umbilical line 126. Light pulse 1602 may travel to distal circulator 312 in umbilical line 126 and the length of downhole fiber 128. Any residual Raman amplification may be reflected back by Fiber Bragg Grating 500 that has been constructed to reflect the particular wavelengths used by the Raman Pump and transmit all others. The backscattered light from the downhole fiber 128 may travel back to distal circulator 312 and then up second fiber optic cable 308 to a dedicated interrogator receiver arm. The interrogator receiver arm may consist of a dedicated amplifier 1608 that may selectively amplify the backscattered light from downhole fiber 128 using a higher amplification factor than the dedicated amplifier 1608 used to selective amplify the backscattered light received from first fiber optic cable 304. Gauges 1612 may have gauge lengths employed in the two dedicated interrogator receiver arms may differ (e.g., also described in FIG. 2). Finally, each dedicated interrogator receiver arm may be equipped with receivers 1606 that are optimized according to certain characteristics of the interferometric signals corresponding to the backscattered light received from the two fiber sensing portions. Note that although FIG. 16 only shows two dedicated interrogator receiver arms for each sensing fiber portion, it is not intended to be limited to such and may be extended to an arbitrary number of dedicated interrogator receiver arms, where each receiver arm receives and processes the backscattered light signal of a single sensing fiber portion of downhole fiber 128.

FIG. 16 further illustrates inputs 1610 for piezoelectric (PZT) devices. In examples, PZT devices functionally allow dynamic stretching (staining) of optical fibers, which may be embodied in coiled form around the PZT, attached thereto, resulting in optical phase modulation of light propagating along the attached optical fiber. The PZT elements are excitable via electrical signals from any electronic signal information generating source thus allowing information to be converted from electrical signals to optical phase modulated signals along the optical fiber attached thereto. Without limitation, PZT devices attached to input 1610 may be a GPS receiver, seismic controller, hydrophone, and/or the like.

The systems and methods for a DAS system within a subsea environment may include any of the various features of the systems and methods disclosed herein, including one or more of the following statements.

Statement 1. A distributed acoustic system (DAS) may comprise an interrogator and an umbilical line comprising a first fiber optic cable and a second fiber optic cable attached at one end to the interrogator. The DAS may further include a downhole fiber attached to the umbilical line at the end opposite the interrogator and a light source disposed in the interrogator that is configured to emit a plurality of coherent light frequencies into the umbilical line and the downhole fiber.

Statement 2. The DAS of statement 1, wherein the interrogator further comprises a Raman Pump.

Statement 3. The DAS of statements 1 or 2, wherein the interrogator further comprises a proximal circulator and a Raman Pump located between the proximal circulator and the umbilical line.

Statement 4. The DAS of statements 1-3, wherein the DAS is disposed in a subsea system operation of one or more wells and the umbilical line attaches to the downhole fiber at a fiber connection.

Statement 5. The DAS of statements 1-4, wherein the first fiber optic cable and the second fiber optic cable are connected to a distal circulator.

Statement 6. The DAS of statement 5, wherein the first fiber optic cable and the second fiber optic cable are different lengths.

Statement 7. The DAS of statements 1-5, further comprising a proximal circulator and a distal circulator and wherein one or more remote circulators form the proximal circulator or the distal circulator.

Statement 8. The DAS of statement 7, further comprising at least one Fiber Bragg Grating attached to the proximal circulator or the distal circulator.

Statement 9. The DAS of statement 7, wherein the interrogator is configured to receive backscattered light from a first sensing region and a second sensing region.

Statement 10. The DAS of statement 9, wherein an interrogator receiver arm is configured to receiver backscattered light from the first sensing region or the second sensing region.

Statement 11. The DAS of statement 10, further comprising an optical amplifier assembly, wherein the optical amplifier assembly is attached to the first fiber optic cable or the second fiber optic cable at the proximal circulator.

Statement 12. The DAS of statement 11, wherein the optical amplifier assembly is attached to the first fiber optic cable or the second fiber optic cable at the distal circulator.

Statement 13. The DAS of statements 1-5 and 7, further comprising at least one Fiber Bragg Grating that is attached between the umbilical line and the end of the downhole fiber.

Statement 14. The DAS of statement 13, wherein the at least one Fiber Bragg Grating is configured for a selected wavelength.

Statement 15. A method for interrogating a formation with a distributed acoustic system (DAS) may comprise transmitting a coherent light that includes a plurality of frequencies into a fiber optic cable from a light source disposed in an interrogator, receiving the plurality of frequencies as a backscattered light from the fiber optic cable with a photo detector assembly, and generating interferometric signals of the plurality of frequencies of backscattered light that have been received by the photo detector assembly. The method may further include processing the interferometric signals with an information handling system.

Statement 16. The method of statement 15, further comprising emitting the coherent light continuously.

Statement 17. The method of statements 15 or 16, further comprising emitting the coherent light in a staggered fashion.

Statement 18. The method of statements 15-17, further comprising changing each of the plurality of frequencies to another frequency during the transmitting of the coherent light.

Statement 19, The method of statements 15-18, wherein the light source is disposed in an interrogator.

Statement 29, The method of statement 20, wherein the photo detector assembly is disposed in the interrogator.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A distributed acoustic system (DAS) comprising:
   an interrogator;
   an umbilical line attached at one end to the interrogator comprising:
      a first fiber optic cable;
      a second fiber optic cable;
      a proximal circulator disposed in the umbilical line and connected to the first fiber optic cable and the second fiber optic cable;
      a distal circulator disposed in the umbilical line and connected to the first fiber optic cable and the second fiber optic cable; and a Raman Pump disposed in the umbilical line and connected to the first fiber optic cable;
a downhole fiber attached to the umbilical line at the end opposite the interrogator; and
a light source disposed in the interrogator that is configured to emit a plurality of coherent light frequencies into the umbilical line and the downhole fiber.

2. The DAS of claim 1, wherein the DAS is disposed in a subsea system operation of one or more wells and the umbilical line attaches to the downhole fiber at a fiber connection.

3. The DAS of claim 1, wherein the first fiber optic cable and the second fiber optic cable are different lengths.

4. The DAS of claim 1, wherein one or more remote circulators form the proximal circulator or the distal circulator.

5. The DAS of claim 4, further comprising at least one Fiber Bragg Grating attached to the proximal circulator or the distal circulator.

6. The DAS of claim 4, wherein the interrogator is configured to receive a backscattered light from a first sensing region and a second sensing region.

7. The DAS of claim 6, wherein an interrogator receiver arm is configured to receiver the backscattered light from the first sensing region or the second sensing region.

8. The DAS of claim 7, further comprising an optical amplifier assembly, wherein the optical amplifier assembly is attached to the first fiber optic cable or the second fiber optic cable at the proximal circulator.

9. The DAS of claim 8, wherein the optical amplifier assembly is attached to the first fiber optic cable or the second fiber optic cable at the distal circulator.

10. The DAS of claim 1, further comprising at least one Fiber Bragg Grating that is attached between the umbilical line and the end of the downhole fiber.

11. The DAS of claim 10, wherein the at least one Fiber Bragg Grating is configured for a selected wavelength.

12. A method for interrogating a formation with a distributed acoustic system (DAS) comprising:
transmitting a coherent light that includes a plurality of frequencies from a light source in an interrogator to a downhole fiber through an umbilical cord connected to the interrogator, wherein the umbilical cord comprises:
a first fiber optic cable;
a second fiber optic cable;
a proximal circulator disposed in the umbilical line and connected to the first fiber optic cable and the second fiber optic cable;
a distal circulator disposed in the umbilical line and connected to the first fiber optic cable and the second fiber optic cable; and
a Raman Pump disposed in the umbilical line and connected to the first fiber optic cable;
receiving the plurality of frequencies as a backscattered light with the interrogator from the downhole fiber through the umbilical line with a photo detector assembly, wherein the photo detector assembly is disposed in the interrogator;
generating interferometric signals of the plurality of frequencies of backscattered light that have been received by the photo detector assembly; and
processing the interferometric signals with an information handling system.

13. The method of claim 12, further comprising emitting the coherent light continuously.

14. The method of claim 12, further comprising emitting the coherent light in a staggered fashion.

15. The method of claim 12, further comprising changing each of the plurality of frequencies to another frequency during the transmitting of the coherent light.

16. The method of claim 12, wherein the light source is disposed in an interrogator.

17. The method of claim 12, wherein the first fiber optic cable and the second fiber optic cable are different lengths.

18. The method of claim 12, wherein one or more remote circulators form the proximal circulator or the distal circulator.

19. The method of claim 12, further comprising at least one Fiber Bragg Grating that is attached between the umbilical line and the end of the downhole fiber.

20. The method of claim 19, wherein the at least one Fiber Bragg Grating is configured for a selected wavelength.

* * * * *